Aug. 18, 1953  J. L. FERGUSON ET AL  2,649,232
METHOD AND APPARATUS FOR HANDLING ARTICLES
Filed Jan. 21, 1950  2 Sheets-Sheet 1
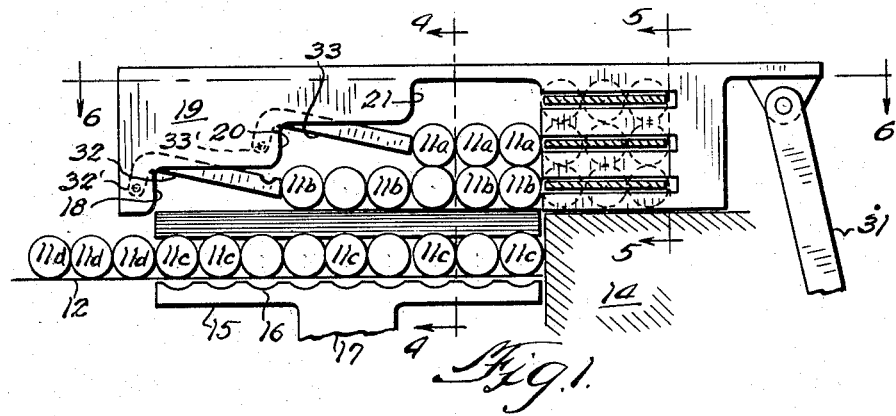
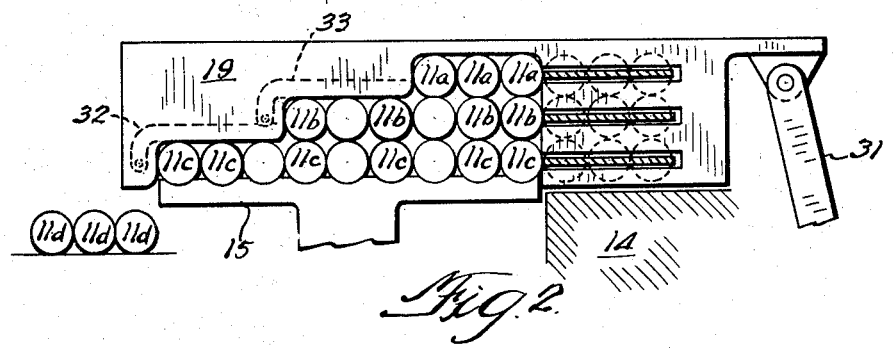
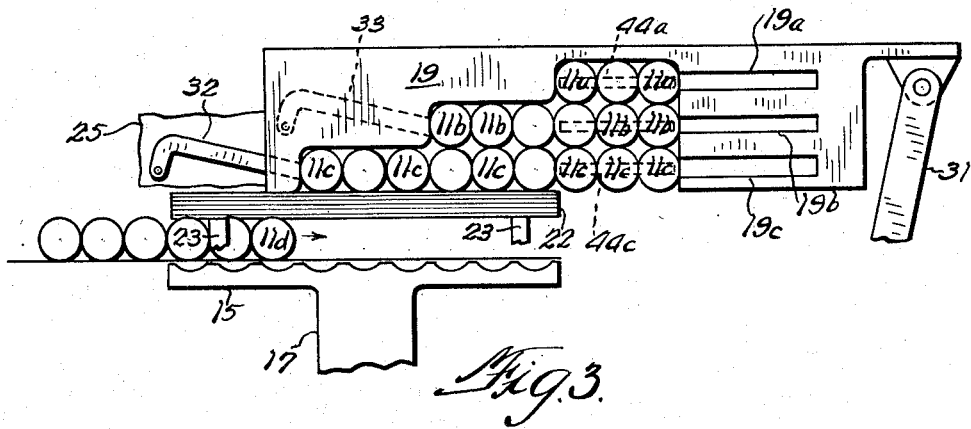
INVENTORS.
John L. Ferguson.
& Richard C. Talbot.

Aug. 18, 1953  J. L. FERGUSON ET AL  2,649,232
METHOD AND APPARATUS FOR HANDLING ARTICLES
Filed Jan. 21, 1950  2 Sheets-Sheet 2
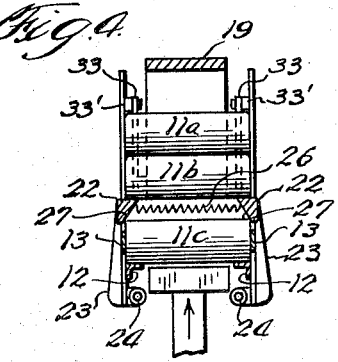
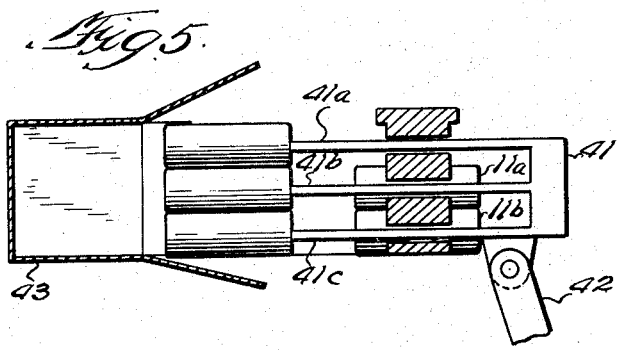
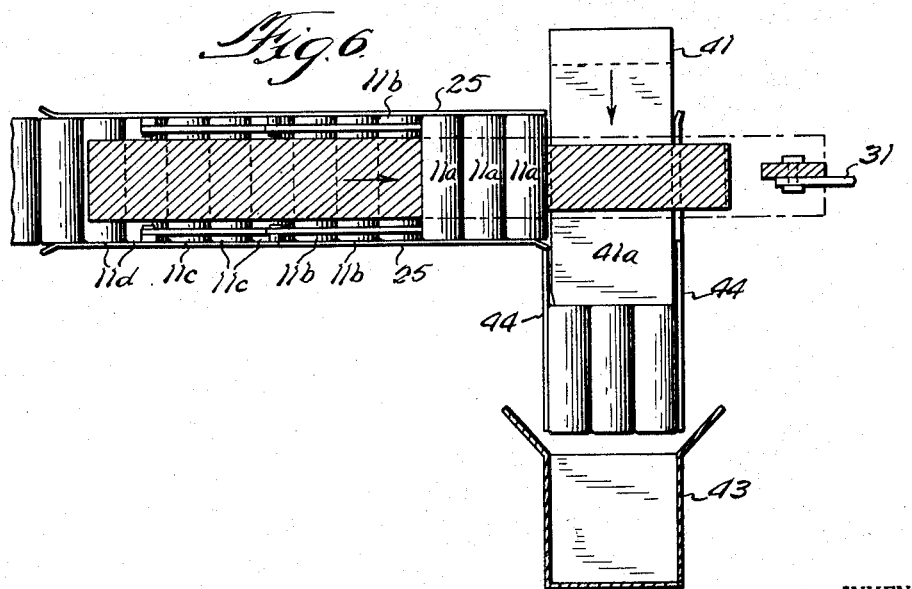
INVENTORS.
John L. Ferguson
Richard C. Talbot.
By Thiess, Olson & Mecklenburger
Attys.

Patented Aug. 18, 1953

2,649,232

UNITED STATES PATENT OFFICE 2,649,232

METHOD AND APPARATUS FOR HANDLING ARTICLES

John L. Ferguson and Richard C. Talbot, Joliet, Ill., assignors to J. L. Ferguson Company, Joliet, Ill., a corporation of Illinois Application January 21, 1950, Serial No. 139,921

10 Claims. (Cl. 226—14)

This invention relates to a method and apparatus for operating on a supply of uniformly shaped articles to rearrange the articles into multiple file, and, more particularly, to a method and apparatus for inserting a predetermined number of uniformly shaped articles such as packaged goods into a container in a predetermined relationship. It is an object of the invention to provide an improved method and apparatus of this character.

The invention disclosed and claimed herein is an improvement over the method and apparatus disclosed and claimed in a copending application of J. L. Ferguson and Richard Talbot, entitled "Automatic Case Loading Method and Apparatus," filed December 22, 1948, having Serial No. 66,604 and assigned to the same assignee as the present invention.

In preparing goods for shipment, it is frequently desired that a specified number of articles be enclosed in a single container in an orderly manner. Various machines and methods have previously been devised for accomplishing this desired result, but there is need for improved method and apparatus which is accurate, reliable, and economical as to original cost, operating cost and maintenance. It is also desired that such apparatus be automatic to as great an extent as is practical in order to reduce labor expense in this step.

According to the invention, a series of articles, preferably arranged in line, are fed to the apparatus for rearrangement into multiple file. According to one embodiment of the invention, two alternately moving plungers are employed for this purpose. The first of these plungers, which shall herein be referred to as a stacking plunger, moves a predetermined number of articles vertically from the supply line into a position in front of the second plunger, which shall herein be referred to as a loading plunger. The group of articles moved in front of the loading plunger by the stacking plunger is then moved, in a direction parallel to the supply line, a distance equal to some predetermined percentage of the length of that group, the more advanced articles in that group being moved beyond the range of the stacking plunger and, for example, onto other conveyor means or into a carton. The loading plunger subsequently withdraws to its original position, leaving the remaining articles of the first group in an advanced position. The stacking plunger then operates a second time and moves a second group of articles in front of the loading plunger thereby forcing the remaining portion of the first group farther upward. The loading plunger has a stepped face so proportioned that on the next forward movement of that plunger it will simultaneously contact the complete second group of articles and the remaining portion of the first group of articles and move both files forward together.

If two files only are to be formed, half of the first group will have been disposed of in the first movement of the loading plunger and the remaining one-half will be disposed of in the second movement along with one-half of the second group. If three files are to be formed, one-third of the first group will have been disposed of in the first movement of the plunger and another one-third will be disposed of in the second movement of the plunger along with one-third of the second group. In this case, a third movement of the stacking plunger will move a third group of articles into a position in front of the first step of the loading plunger, this movement forcing the remaining two-thirds of the second group in front of the second step of the loading plunger and the remaining third of the first group in front of a third stepped portion of the loading plunger. Three files are thereby formed and the third forward movement of the loading plunger will force these three files forward, disposing of the remainder of the first group and equal numbers of articles from the second and third groups.

It will be apparent that any number of files may thus be formed from the original supply line, it being necessary only to add additional stepped faces on the loading plunger and to move a sufficiently large number of articles in front of the loading plunger with each operation of the stacking plunger.

With this arrangement, only a single plunger is required to thrust the articles in front of the loading plunger, and a portion of the group of articles so thrust in front of the loading plunger acts temporarily as a spacer or as a part of the loading plunger to assist the loading plunger proper in driving other articles forward. This simplifies the method and reduces the number of parts required in a machine for accomplishing the desired result as compared to the methods and apparati previously known.

Accordingly, it is another object of the invention to provide an improved and simplified method and apparatus for arranging articles in multiple file.

It is another object of the invention to provide an improved and simplified method and apparatus for loading articles into containers in a predetermined relationship.

This invention, together with further objects and advantages thereof, will best be understood by reference to the following description taken in connection with the accompanying drawings, and its scope will be pointed out in the appended claims.

In the drawings, in which like parts are indicated by like reference numerals:

Fig. 1 is a schematic-elevational view of apparatus incorporating one embodiment of the invention;

Fig. 2 is a similar view showing the same apparatus illustrated in Fig. 1 in a different operating position;

Fig. 3 is a similar view showing the same apparatus in still another operating position;

Fig. 4 is a cross-sectional view of the same apparatus taken along the line 4—4 of Fig. 1;

Fig. 5 is a cross-sectional view of the same apparatus taken along the line 5—5 of Fig. 1; and Fig. 6 is a cross-sectional view of the same apparatus taken along the line 6—6 of Fig. 1.

The particular embodiment of the invention appearing in the drawings is designed to operate on a single file of articles such as cans designated 11a, b, c, and d and to rearrange this file into a triple file. The apparatus inherently operates on an intermittent basis, the multiple file produced thereby moving forward in steps, and in the particular machine illustrated the multiple file moves forward at each step a distance equal to the diameter of three cans. This intermittent progress is desirable in many applications, such as in arranging the cans for loading into cartons.

The cans are fed to an operating station in the machine along conveyor means comprising a pair of supporting rails 12, and a pair of guide rails 13, best seen in Fig. 4. Many different types of conveyor means may be successfully employed, one example of which is an endless conveyor belt. In the apparatus shown, however, the cans roll along the rails 12 between the guide rails 13 and are resiliently urged along this path, as, for example, by gravity, to the positions occupied by the cans 11c, as seen in Fig. 1.

The supporting rails 12 may slope downwardly to the right in Figs. 1, 2, and 3, or, preferably, that portion of the tracks to the left of the machine, in Fig. 1, is sloping such that the oncoming supply of cans urges the cans which are on the horizontal portion of the track within the machine toward the right in Fig. 1. Forward movement of the cans is limited by contact of the lead can with the side of a platform 14.

The nine cans 11c in the forwardmost position on the tracks 12 are in position to be engaged by a vertically movable plunger 15. This plunger is normally located immediately below the tracks 12, as shown in Figs. 1, 3, and 4, and is of such width that it may pass freely between the rails 12 and engage the middle portion of the cans located immediately thereabove. This plunger is of sufficient width, however, to engage a substantial portion of the cans and preferably has a series of depressions 16 shaped to fit the cans whereby the plunger may support the cans securely on its upper surface.

It should be noted that the plunger 15 might be arranged to engage the ends of the cans while the conveyor means engages the center portion of the cans. The preferred embodiment is, however, as shown in the drawings and described immediately above.

Means, not shown in the drawings, are provided for intermittently raising and lowering the stacking plunger through a shaft 17. When the plunger is caused to rise, it passes between the rails 12, lifts the nine most advanced cans 11c, and raises them to a position in front of one face 18 of the stepped rearward wall of a loading plunger 19, this position of the cans being illustrated in Fig. 2.

The raising of the nine cans 11c forces six cans designated 11b and three cans designated 11a upwardly to positions immediately in front of other faces 20 and 21 of the loading plunger 19. In initiating operation of the machine, the cans 11a and 11b may be manually placed in the positions indicated in Fig. 1. However, succeeding groups of cans will subsequently occupy those same positions by virtue of the normal operation of the machine as will subsequently become clear.

The cans 11c and hence the cans 11b and 11a are supported in the elevated position, shown in Figs. 2 and 3, after the stacking plunger 15 is lowered, by means of pivoted supporting members 22, best seen in Figs. 3 and 4. The supporting members include an upper portion arranged for contact with the cans 11c and vertically extending arms 23 which are pivotally secured through pins 24 to frame members 25, shown in Fig. 6.

A spring 26 is connected to the two supporting elements 22 and urges these members together toward the position illustrated in Fig. 4 wherein they suport the cans located thereabove. When the cans are elevated by the stacking plunger 15, the ends of the cans strike the inner, sloping surfaces 27 of the supporting members 22 and force the supporting members apart, by a camming action, to permit the passage of the cans therebetween. As soon as the lower edges of the cans have passed upwardly beyond the upper surface of the supporting members 22, the supporting members are free to return to their normal position under the influence of the spring 26.

With the cans 11a, 11b, and 11c elevated to the positions and the supporting members 22 in their normal positions, as shown in Figs. 2 and 4, the stacking plunger 15 may be lowered and the loading plunger 19 may be moved toward the right as shown in Fig. 3. The loading plunger is operated by means, not shown in the drawings, acting through a lever 31 and is made to move a distance equal to the width of three cans whereby the three cans 11a, the first three of the cans 11b, and the first three cans designated 11c are moved to the right beyond operating station or beyond the end of the stacking plunger 15. These cans are arranged in three files and, if desired, may be allowed to remain in the position shown in Fig. 3 until such time as nine more cans are thrust forward, or to the right in Figs. 1, 2, and 3. In this case, an intermittently advancing, continuous, triple file may be formed. However, in the application of the apparatus illustrated in the drawings, each group of nine cans thus arranged in triple file is removed by means to be described below and is placed ultimately within a carton for shipment.

After the nine cans arranged in triple file have thus been removed beyond the range of the stacking plunger 15, the loading plunger 19 withdraws to the left leaving three of the cans 11b and six of the cans designated 11c in an advanced position, this being the originally discussed portion of the cycle shown in Fig. 1.

Referring back to Fig. 1, it will be noticed that the three cans 11a and the six cans 11b are not in contact with any of the three stepped faces 18, 20 or 21 of the loading plunger 19 and hence require other means for maintaining these cans in their advanced position. A series of pivoted stops are provided for this purpose, a pair of stops 32 serving to hold the six cans 11b in their advanced position, as shown in Fig. 1, and a pair of stops 33 being provided to hold the three cans 11a. The stops 32 and 33 are pivoted at points 32' and 33', respectively, to the frame members 25 of the machine.

When the nine cans 11c are raised by the stacking plunger 15, the stops 32 are moved upwardly to the position shown in Fig. 2 by the three rearwardmost cans 11c. At the same time, the stops 33 are raised to the position shown in Fig. 2 by the three rearwardmost of the cans 11b. When the loading plunger 19 moves forward, the stops 32 and 33 remain stationary since they are pivotally secured to the frame of the machine, and when the loading plunger reaches its forwardmost position, the stops are free to drop down again to the positions shown in Figs. 1 and 3 wherein the ends of the stops engage the rearwardmost can in the lower and middle files. These stops then support the remaining cans in those files in their advanced position, as may be see in Fig. 1, after the loading plunger 19 is withdrawn and until the stacking plunger 15 raises more cans into loading position.

The rearward or stepped wall of the loading plunger 19 is made narrower than the length of the cans, as may be seen in Fig. 4, whereby the two ends of the cans are available for engagement by the pivoted stops 32 and 33 for the purpose specified and whereby the rearward portion of the plunger may pass freely between the pivoted stops.

As indicated above, the particular embodiment of the invention described herein is applied to the loading of cans into a carton or other container. The nine cans which are intermittently made to appear in triple file beyond the right-hand extremity of the stacking plunger 15, are driven from that position by a transporting plunger 41, partially visible in Figs. 1, 2, and 3 but best seen in Figs. 5 and 6.

When the cans are in the position illustrated in Fig. 3, the nine cans which have been arranged in triple file and removed beyond the operating station, or beyond the right-hand end of the stacking plunger 15, are located in front of the transporting plunger 41. While the loading plunger 19 is still in its most advanced position as illustrated in Fig. 3, the transporting plunger 41 is driven to the left as seen in Fig. 5 through a lever 42. The can-engaging portion of the transporting plunger consists of a triple fork, the upper tine 41a engaging the three cans 11a, the central tine 41b engaging three of the cans 11b, and the lowermost tine 41c engaging three of the cans designated 11c. Movement of the transporting plunger 41 to the left thereby drives the aforementioned nine cans to the left and into a container 43. Retaining walls 44 are provided, as may be seen in Fig. 6, to hold these nine cans in their stacked relationship until the cans are deposited in the container.

As soon as these cans have been removed from their position in front of the loading plunger 19, the latter plunger may be returned to the left in Figs. 1, 2, 3, and 6, three slots 19a, 19b, and 19c being provided therein to receive freely the three tines 41a, 41b and 41c, respectively, of the transporting plunger 41. The left-hand edges of the two lower tines of the transporting plunger support the cans remaining in front of the loading plunger 19 and prevent them from moving or falling to the right in Figs. 1, 2, and 3. These tines of the transporting plunger remain in this supporting position until such time as the loading plunger has returned to its left-hand position as seen in Fig. 1. When the loading plunger has so returned to its left-hand position, the right-hand or slotted portion of the plunger is in position to support the cans 11a and 11b seen in Fig. 1, and the transporting plunger can now be withdrawn to the right in Fig. 5 in readiness for advancement of nine more cans in triple file to a position in front of the transporting plunger.

In the above description, reference is made to driving mechanism for operating the stacking plunger 15, the loading plunger 19 and the transporting plunger 41. Such driving mechanism can be of any suitable form and, specifically, can be of the general type described in the application of John L. Ferguson and Richard C. Talbot, Serial No. 66,604, filed December 22, 1948, entitled Automatic Case Loading Method and Apparatus, and assigned to the same assignee as the present invention.

Since such driving mechanism is readily devised and does not form a part of the present invention, it is not described in the present application.

The invention is also applicable to arranging the cans in horizontal files and rows. In such a case, certain of the novel features of the embodiment described above are not necessary. For example, the stops 32 and 33 need not be of the same form shown in the drawings and the supporting members 22 may be of different form, or these devices may be eliminated entirely. In the latter case, the stacking plunger 15, which may have a smooth face, could be arranged to remain in its advanced position while the loading plunger drives the cans forward, the stacking plunger acting as a guide for the cans.

It will be readily apparent that the method and apparatus shown and described can be readily modified to handle any number of files of articles. If for example, it is desired to arrange the articles in a quadruple file, it is necessary that a fourth-stepped face similar to the faces 18, 20, and 21 must be added to the loading plunger. It will also be necessary that the stacking plunger be elongated so that it moves 12 cans in front of the loading plunger at each stroke.

It will also be apparent that the apparatus may be readily modified to arrange any desired number of articles in each file in each group. For example, if it were desired that there be four articles in each of three files, it is necessary that the stepped faces 18, 20, and 21 of the loading plunger 19 be separated by a distance equal to the width of four articles and that the stacking plunger 15 be arranged to move 12 articles in front of the loading plunger at each stroke.

In the preferred embodiment of the invention, the desired number of files are formed separate of and displaced from the supply file or line. However, it is possible to utilize the supply line as one of the multiple files. In such case, the articles as displaced by the stacking plunger are moved by a distance equal to the width of the supply file. The subsequent withdrawal of the stacking plunger and advancement of the supply file places the newly advanced articles of the supply file in multiple file with the displaced articles. The arrangement of articles, shown in Fig. 2 for example, will become a quadruple file upon the advance of the supply file to the position shown in Fig. 1. The quadruple file could then be moved to the right by a combined motion of the loading plunger and the supply file.

It will be further apparent that the loading plunger, while it preferably moves substantially parallel to the supply line, can move in either of the two parallel directions. For example, the loading plunger 19 can be made to move the cans to the left in Figs. 1, 2, and 3, or the loading plunger may be made to operate as shown in Figs. 1, 2, and 3, and the supply line may be fed from the right in those figures. Similarly, the supply file may be advanced into the position occupied by the cans 11c in Fig. 1 from any of numerous directions and where it is stated herein that the loading plunger preferably moves subsequently parallel to the supply file, it is meant that this plunger movement is parallel to the supply file as it appears in front of the stacking plunger 15.

It will be still further apparent that the supply line or supply file need not be a single file but, of itself, can be a double or other multiple file. Apparatus constructed in accordance with this invention rearranges the articles in a number of files which is an integral multiple of the number of articles abreast in the supply file.

It will be apparent that the invention may be varied in its physical embodiment without departing from the spirit of the invention, and it is desired, therefore, that the invention be limited only by the prior art and the scope of the appended claims.

The invention having thus been described, what is claimed and desired to be secured by Letters Patent is:

1. Apparatus for arranging a predetermined number of uniformly shaped articles in a predetermined number of files and rows comprising; first conveyor means adapted to engage a portion of the surface of such articles for moving such articles into a horizontal line at an operating station; second conveyor means vertically movable past said first conveyor means to engage another portion of the surface of said articles and to move successive groups of articles of predetermined number upwardly from said operating station to a definite elevated position; and a loading plunger having a vertical forward wall and a stepped rearward wall for receiving and confining, in conjunction with said second conveyor means, such complete group of articles and a fractional portion of at least one preceding group displaced upwardly of said definite elevated position by movement of such complete group to said position by said second conveyor means, said loading plunger successively moving all of the articles so confined forwardly as a unit in a horizontal direction parallel to said line to displace an equal integral number of articles of said complete group and such fractional preceding group longitudinally beyond one extremity of said definite elevated position, said integral number being evenly divisible into said predetermined number of articles in said complete group.

2. Apparatus for arranging a predetermined number of uniformly shaped articles in a predetermined number of files and rows comprising; first conveyor means adapted to engage a portion of the surface of such aritcles for moving such articles into a horizontal line at an operating station; second conveyor means vertically movable past said first conveyor means to engage another portion of the surface of said articles and to move successive groups of articles of predetermined number upwardly from said operating station to a definite elevated position; means for supporting such groups in said elevated position, said means being engageable with a portion of the surface of said articles other than that engaged by said second conveyor means; and a loading plunger having a vertical forward wall and a stepped rearward wall for receiving and confining, in conjunction with said supporting means such complete group of articles and a fractional portion of at least one preceding group displaced upwardly of said definite elevated positon by movement of such complete group to said position by said second conveyor means, said loading plunger successively moving all of the articles so confined forwardly as a unit in a horizontal direction parallel to said line to displace an equal integral number of articles of said complete group and such fractional preceding group longitudinally beyond one extremity of said definite elevated position, said integral number being evenly divisible into said predetermined number of articles in said complete group.

3. Apparatus for arranging a predetermined number of uniformly shaped articles in a predetermined number of files and rows comprising; first conveyor means adapted to engage a portion of the surface of such articles for moving such articles into a horizontal line at an operating station; second conveyor means vertically movable past said first conveyor means to engage another portion of the surface of said articles and to move successive groups of articles of predetermined number upwardly from said operating station to a definite elevated position; means for supporting such groups in said elevated position, said means being engageable with a portion of the surface of said articles other than that engaged by said second conveyor means; and a loading plunger having a vertical forward wall and a stepped rearward wall for receiving and confining, in conjunction with said supporting means such complete group of articles and a fractional portion of at least one preceding group displaced upwardly of said definite elevated position by movement of such complete group to said position by said second conveyor means, said rearward wall being engageable with a portion of the surface of said articles other than that engaged by said supporting means and being movable past said supporting means to transport all of the articles so confined forwardly as a unit in a horizontal direction parallel to said line to displace an equal integral number of articles of said complete group and such fractional preceding group longitudinally beyond one extremity of said definite elevated position, said integral number being evenly divisible into said predetermined number of articles in said complete group.

4. Apparatus for arranging a predetermined number of uniformly shaped articles in a predetermined number of files and rows comprising; conveyor means including a pair of spaced elements engaging the edges of the lower surfaces of such articles for moving such articles into a horizontal line at an operating station; a stacking plunger normally positioned below said operating station, said stacking plunger being movable between said spaced elements of said conveyor means to engage the central portion of the lower surface of said articles, and arranged to move successive groups of articles of predetermined number upwardly from said operating station to a definite elevated position, and to return to its normal position below said conveyor means; a pair of spaced supporting members engageable with the edges of the lower surface of said articles and supporting such groups in said elevated position when said stacking plunger returns to its normal position; and a loading plunger having a vertical forward wall and a stepped rearward wall for receiving and confining, in conjunction with said supporting members, such complete group of articles and a fractional portion of at least one preceding group displaced upwardly of said definite elevated position by movement of such complete group to said position by said stacking plunger, said loading plunger successively moving all of the articles so confined forwardly as a unit in a horizontal direction parallel to said line to displace an equal integral number of articles of said complete group and such fractional preceding group longitudinally beyond one extremity of said definite elevated position, said integral number being evenly divisible into said predetermined number of articles in said complete group.

5. Apparatus for arranging a predetermined number of uniformly shaped articles in a predetermined number of files and rows comprising; conveyor means including a pair of spaced elements engaging the edges of the lower surfaces of such articles for moving such articles into a horizontal line at an operating station; a stacking plunger normally positioned below said operating station, said stacking plunger being movable between said spaced elements of said conveyor means to engage the central portion of the lower surface of said articles, and arranged to move successive groups of articles of predetermined number upwardly from said operating station to a definite elevated position, and to return to its normal position below said conveyor means; a pair of spaced supporting members engageable with the edges of the lower surface of said articles and supporting such groups in said elevated position when said stacking plunger returns to its normal position; a loading plunger having a vertical forward wall and a stepped rearward wall for receiving and confining, in conjunction with said supporting members, such complete group of articles and a fractional portion of at least one preceding group displaced upwardly of said definite elevated position by movement of such complete group to said position by said stacking plunger, said loading plunger successively moving all of the articles so confined forwardly as a unit in a horizontal direction parallel to said line to displace an equal integral number of articles of said complete group and such fractional preceding group longitudinally beyond one extremity of said definite elevated position, said integral number being evenly divisible into said predetermined number of articles in said complete group; and a transporting plunger movable laterally to the movement of said loading plunger when said loading plunger is in its forward position for driving said displaced articles laterally from between said forward and rearward walls of said loading plunger.

6. Apparatus for arranging a predetermined number of uniformly shaped articles in a predetermined number of files and rows comprising; conveyor means including a pair of spaced elements engaging the edges of the lower surfaces of such articles for moving such articles into a horizontal line at an operating station; a stacking plunger normally positioned below said operating station, said stacking plunger being movable between said spaced elements of said conveyor means to engage the central portion of the lower surface of said articles, and arranged to move successive groups of articles of predetermined number upwardly from said operating station to a definite elevated position, and to return to its normal position below said conveyor means; a pair of spaced supporting members engageable with the edges of the lower surface of said articles and supporting such groups in said elevated position when said stacking plunger returns to its normal position; a loading plunger having a vertical forward wall and a stepped rearward wall for receiving and confining, in conjunction with said supporting members, such complete group of articles and a fractional portion of at least one preceding group displaced upwardly of said definite elevated position by movement of such complete group to said position by said stacking plunger, said loading plunger successively moving all of the articles so confined forwardly as a unit in a horizontal direction parallel to said line to displace an equal integral number of articles of said complete group and such fractional preceding group longitudinally beyond one extremity of said definite elevated position, said integral number being evenly divisible into said predetermined number of articles in said complete group; and a transporting plunger having a slotted face, said forward wall of said loading plunger being slotted for permitting passage laterally therethrough of the slotted face of said transporting plunger, said transporting plunger advancing in a direction lateral to the movement of said loading plunger when said loading plunger is in its forward position, said transporting plunger thereby driving said displaced articles laterally from between said forward and rearward walls of said loading plunger, said loading plunger moving rearwardly while said transporting plunger is in its advanced position, one side of said transporting plunger confining one end of the remaining fractional group until said forward wall of said loading plunger returns to its rearward position.

7. Apparatus for arranging a predetermined number of uniformly shaped articles in a predetermined number of files and rows comprising; conveyor means including a pair of spaced elements engaging the edges of the lower surfaces of such articles for moving such articles into a horizontal line at an operating station; a stacking plunger normally positioned below said operating station, said stacking plunger being movable between said spaced elements of said conveyor means to engage the central portion of the lower surface of said articles, and arranged to move successive groups of articles of predetermined number upwardly from said operating station to a definite elevated position, and to return to its normal position below said conveyor means; a pair of spaced supporting members engageable with the edges of the lower surface of said articles and supporting such groups in said elevated position when said stacking plunger returns to its normal position; a loading plunger having a vertical forward wall and a stepped rearward wall for receiving and confining, in conjunction with said supporting members, such complete group of articles and a fractional portion of at least one preceding group displaced upwardly of said definite elevated position by movement of such complete group to said position by said stacking plunger, said loading plunger successively moving all of the articles so confined forwardly as a unit in a horizontal direction parallel to said line to displace an equal integral number of articles of said complete group and such fractional preceding group longitudinally beyond one extremity of said definite elevated position, said integral number being evenly divisible into said predetermined number of articles in said complete group; a transporting plunger having a slotted face, said forward wall of said loading plunger being slotted for permitting passage laterally therethrough of the slotted face of said transporting plunger, said transporting plunger advancing in a direction lateral to the movement of said loading plunger when said loading plunger is in its forward position, said transporting plunger thereby driving said displaced articles laterally from between said forward and rearward walls of said loading plunger, said loading plunger moving rearwardly while said transporting plunger is in its advanced position, one side of said transporting plunger confining one end of the remaining fractional group until said forward wall of said loading plunger returns to its rearward position; and latch means engageable with the edges of the article at the rearward end of said fractional group and confining such fractional group until a subsequent complete group of articles is elevated by said stacking plunger to raise such fractional group farther upwardly to a position wherein it is confined by said forward wall and said stepped rearward wall of said loading plunger.

8. Apparatus for arranging a predetermined number of uniformly shaped articles in a predetermined number of files and rows comprising; conveyor means including a pair of spaced elements engaging the edges of the lower surfaces of such articles for moving such articles into a horizontal line at an operating station; a stacking plunger normally positioned below said operating station, said stacking plunger being movable between said spaced elements of said conveyor means to engage the central portion of the lower surface of said articles, and arranged to move successive groups of articles of predetermined number upwardly from said operating station to a definite elevated position, and to return to its normal position below said conveyor means; a pair of spaced supporting members engageable with the edges of the lower surface of said articles and supporting such groups in said elevated position when said stacking plunger returns to its normal position; a loading plunger having a vertical forward wall and a stepped rearward wall for receiving and confining, in conjunction with said supporting members, such complete group of articles and a fractional portion of at least one preceding group displaced upwardly of said definite elevated position by movement of such complete group to said position by said stacking plunger, said loading plunger successively moving all of the articles so confined forwardly as a unit in a horizontal direction parallel to said line to displace an equal integral number of articles of said complete group and such fractional preceding group longitudinally beyond one extremity of said definite elevated position, said integral number being evenly divisible into said predetermined number of articles in said complete group; a transporting plunger having a slotted face, said forward wall of said loading plunger being slotted for permitting passage laterally therethrough of the slotted face of said transporting plunger, said transporting plunger advancing in a direction lateral to the movement of said loading plunger when said loading plunger is in its forward position, said transporting plunger thereby driving said displaced articles laterally from between said forward and rearward walls of said loading plunger, said loading plunger moving rearwardly while said transporting plunger is in its advanced position, one side of said transporting plunger confining one end of the remaining fractional group until said forward wall of said loading plunger returns to its rearward position; and latch means engageable with the edges of the article at the rearward end of said fractional group and confining such fractional group until a subsequent complete group of articles is elevated by said stacking plunger to raise such fractional group farther upwardly to a position wherein it is confined by said forward wall and said stepped rearward wall of said loading plunger, said rearward stepped wall of said loading plunger being engageable with the center portion of said articles and being movable between said latching means.

9. Apparatus for arranging a predetermined number of uniformly shaped articles in a predetermined number of files and rows comprising; conveyor means including a pair of spaced elements engaging the edges of the lower surfaces of such articles for moving such articles into a horizontal line at an operating station; a stacking plunger normally positioned below said operating station, said stacking plunger being movable between said spaced elements of said conveyor means to engage the central portion of the lower surface of said articles, and arranged to move successive groups of articles of predetermined number upwardly from said operating station to a definite elevated position, and to return to its normal position below said conveyor means; a pair of spaced supporting members engageable with the edges of the lower surface of said articles and supporting such groups in said elevated position when said stacking plunger returns to its normal position, (said supporting members being resiliently displaceable by said articles to permit passage of such groups of articles upwardly therebetween); a loading plunger having a vertical forward wall and a stepped rearward wall for receiving and confining, in conjunction with said supporting members, such complete group of articles and a fractional portion of at least one preceding group displaced upwardly of said definite elevated position by movement of such complete group to said position by said stacking plunger, said loading plunger successively moving all of the articles so confined forwardly as a unit in a horizontal direction parallel to said line to displace an equal integral number of articles of said complete group and such fractional preceding group longitudinally beyond one extremity of said definite elevated position, said integral number being evenly divisible into said predetermined number of articles in said complete group; a transporting plunger having a slotted face, said forward wall of said loading plunger being slotted for permitting passage laterally therethrough of the slotted face of said transporting plunger, said transporting plunger advancing in a direction lateral to the movement of said loading plunger when said loading plunger is in its forward position, said transporting plunger thereby driving said displaced articles laterally from between said forward and rearward walls of said loading plunger, said loading plunger moving rearwardly while said transporting plunger is in its advanced position, one side of said transporting plunger confining one end of the remaining fractional group until said forward wall of said loading plunger returns to its rearward position; and latch means engageable with the edges of the article at the rearward end of said fractional group and confining such fractional group until a subsequent complete group of articles is elevated by said stacking plunger to raise such fractional group farther upwardly to a position wherein it is confined by said forward wall and said stepped rearward wall of said loading plunger, said rearward stepped wall of said loading plunger being engageable with the center portion of said articles and being movable between said latching means.

10. The method of automatically assembling a predetermined number of uniformly shaped articles in a predetermined arrangement of files and rows comprising advancing such articles in a line to form a horizontal line at an operating station, successively moving groups of such articles of predetermining equal number vertically to form a first file, such movement forcing the remaining portion of at least one preceding group further vertically to form at least a second file of a lesser number of articles, moving all of the articles of such complete group and such portion of a group equal distances in a direction parallel to said files, said second-named movement displacing an equal number of articles of each of said files longitudinally beyond the limits of said operating station, the total number of articles so displaced equaling said predetermined number of articles in each complete group.

JOHN L. FERGUSON.
RICHARD C. TALBOT.

No references cited.